(12) United States Patent
Mead et al.

(10) Patent No.: US 7,542,135 B2
(45) Date of Patent: Jun. 2, 2009

(54) DEVICE FOR INSPECTING COUNTERSUNK HOLES

(75) Inventors: William T. Mead, Long Beach, CA (US); Dennis Bowles, Fullerton, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 108 days.

(21) Appl. No.: 11/810,588

(22) Filed: Jun. 6, 2007

(65) Prior Publication Data
US 2008/0304085 A1    Dec. 11, 2008

(51) Int. Cl.
*G01N 21/00* (2006.01)
(52) U.S. Cl. .................... 356/237.6; 356/601; 356/607; 408/13; 408/82; 408/201
(58) Field of Classification Search .................. 356/601, 356/602, 237.6, 607, 606, 376; 408/13, 67, 408/82, 225, 201, 236
See application file for complete search history.

(56) References Cited

U.S. PATENT DOCUMENTS 6,154,279 A  *  11/2000  Thayer ......................... 356/602
6,714,307 B2 *  3/2004  De Groot et al. ............. 356/512

* cited by examiner

*Primary Examiner*—Gregory J Toatley, Jr.
*Assistant Examiner*—Iyabo S Alli
(74) *Attorney, Agent, or Firm*—Louis L. Dachs

(57) ABSTRACT

The invention is a non contact laser inspection self centering device to inspect the counter sink portion of a counter sunk fastener hole on a surface. In detail, the self centering and seating device includes a combination laser transmitter and receiver for transmitting a laser bean across a surface and for receiving the return signal from the surface. A self centering device is attached to the combination laser transmitter and receiver for aligning the laser transmitter with the fastener hole such that the transmitted and received laser beam passes across the center of the counter sink portion of the fastener hole. A computer system is connected to the combination laser transmitter and receiver for analyzing the transmitted and returned laser signal from the surface and determining if the counter sink portion of the hole is within tolerance.

2 Claims, 4 Drawing Sheets

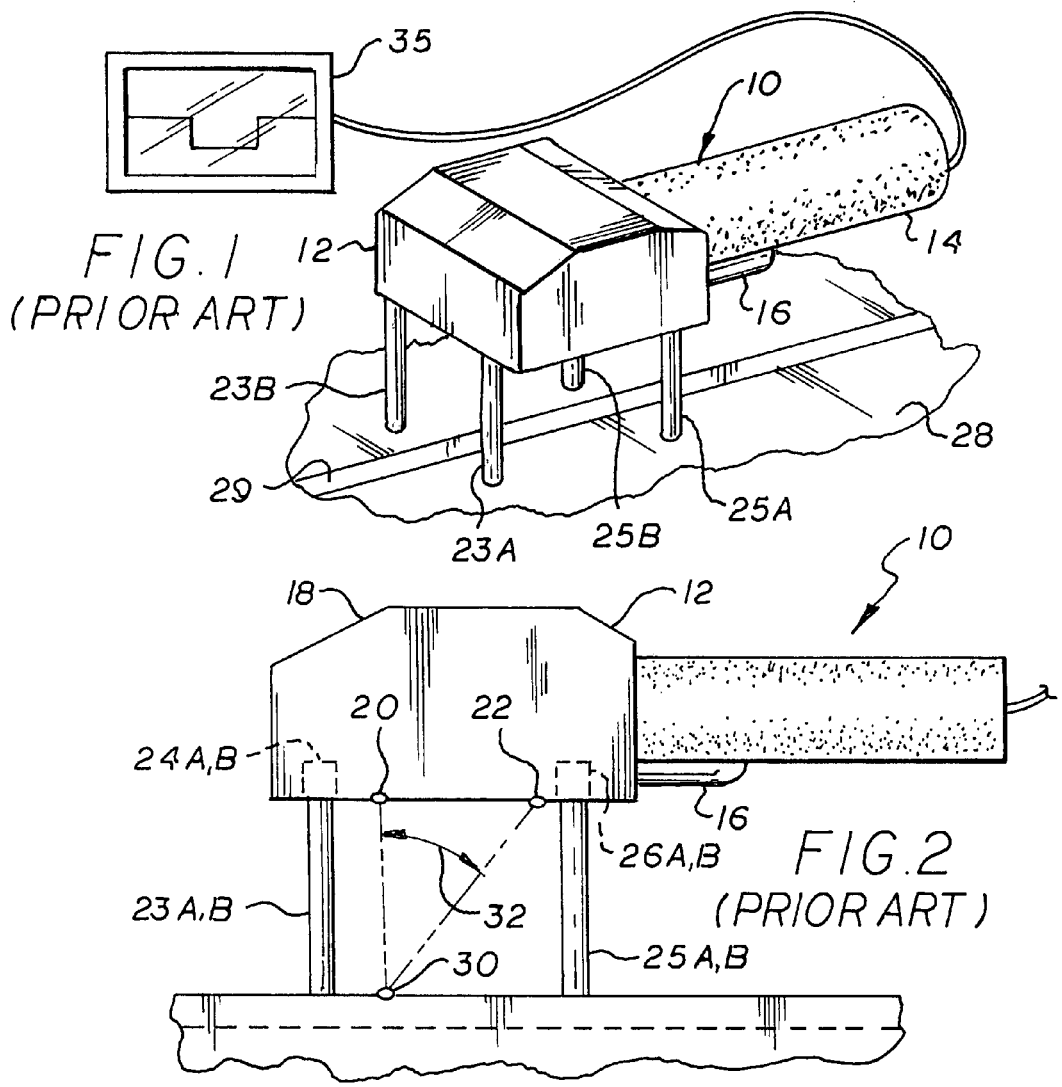
FIG. 1 (PRIOR ART)
FIG. 2 (PRIOR ART)
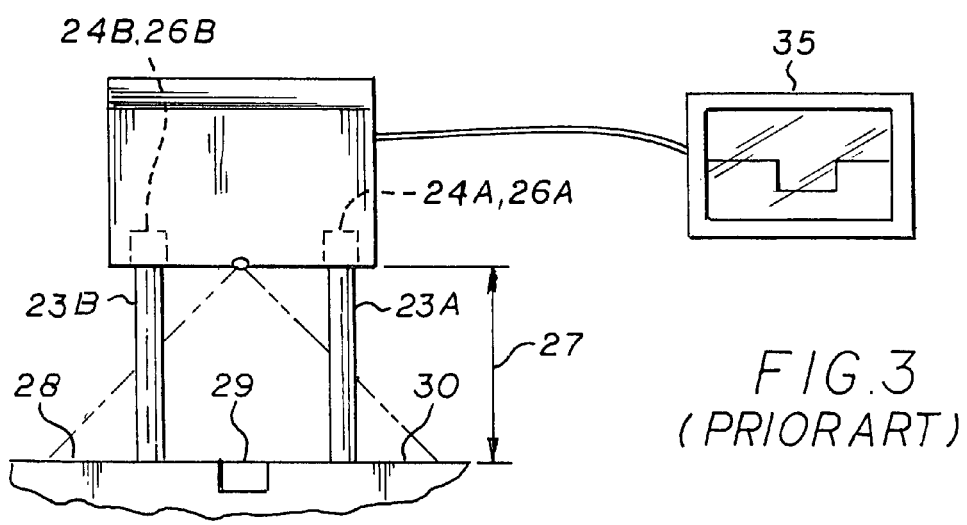
FIG. 3 (PRIOR ART)

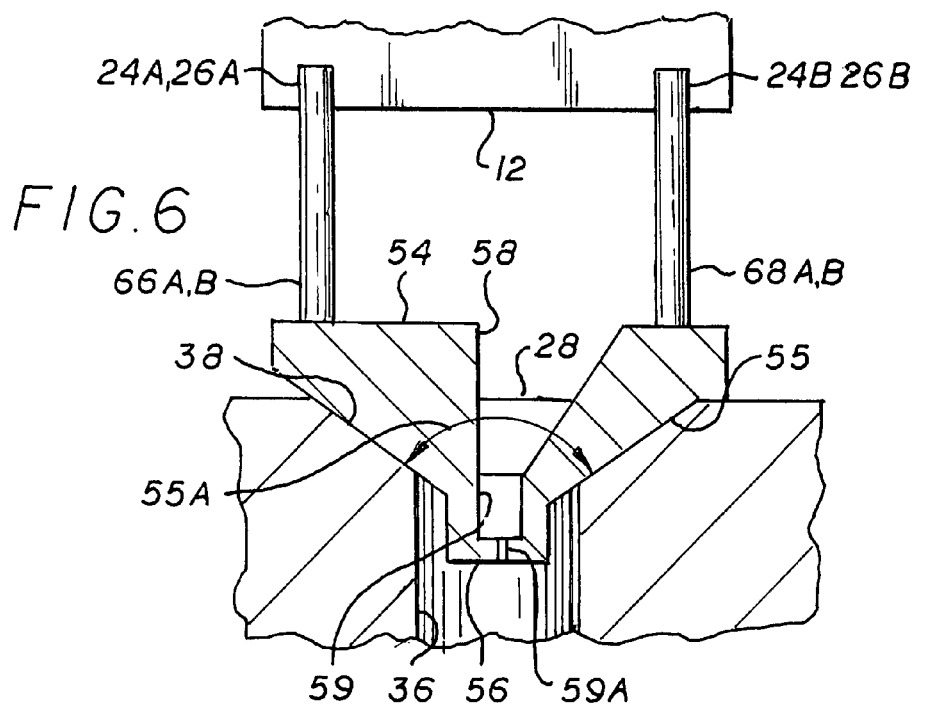
FIG. 6
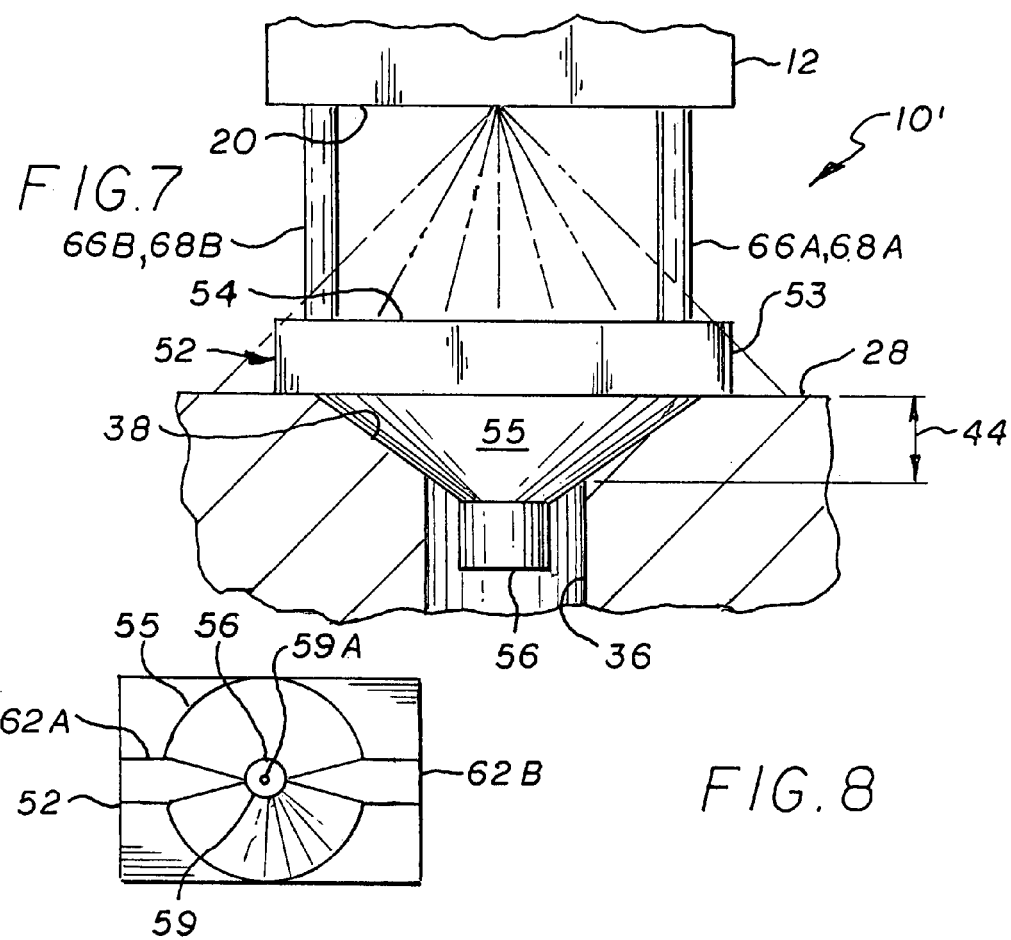
FIG. 7
FIG. 8

DEVICE FOR INSPECTING COUNTERSUNK HOLES

BACKGROUND OF THE INVENTION

1. Field of the Invention

The invention relates to the field of inspection devices and, in particular, to a self centering device that allows a laser measurement device to inspect the countersink in countersunk holes.

2. Description of Related Art

Flush head fasteners require that the fastener holes be countersunk. The inspection of countersink portion of holes is a time consuming operation; particularly if mechanical or optical inspection techniques are used. This is particularly true on large aircraft structures with a tremendous number of such fasteners. While automated drilling equipment greatly reduces the chance of out of tolerance fastener holes, inspection is still required. One of the most common methods is to use a Trulok gage, which consists of a spring loaded ball, which is seated in the countersink. It can determine only the depth of the countersink. It is calibrated assuming a 100 degree countersink. Several different balls are required because of the necessity of seating the balls tangent to the countersink. Finally it can not be used on complex surfaces. What is needed is a simple and automatic measuring device that can be installed in an automated fastener drilling machine or operated by hand.

Lasers are used in numerous inspection and measurement systems. One particularly useful device is a portable gap measurement system; particularly useful in inspecting the gaps between body panels and doors on automobiles. This device is a hand held and passed along the gap and automatically measures and records the gap and determines whether the gap is out of tolerance. The device consists of a laser transmitter, which passes a laser beam back and forth across the gap (forming a visual line across the gap) and an optical light receiver and recorder. The change in time of the received laser light as it passes over the edges of the gap is recorded by a laser line sensor which enables extremely high resolution profile scanning of up to 500 points across a horizontal measuring line of one inch length as well as the change when the laser light beam passes out of the gap. It is a simple calculation to determine the width of the gap and whether it is in tolerance or not. If such a device could be properly positioned over a countersunk hole it could be used determine if it was in tolerance or not.

Thus, it is a primary object of the invention to provide a device that can self center the laser beam to measure the dimensions of a countersink hole.

It is another primary object of the invention to provide a device that can self center the laser beam to measure the dimensions of a countersink that is portable.

It is a further object of the invention to provide a device that can measure the dimensions of a countersink that is portable based on existing gap measurement devices using laser beams.

SUMMARY OF THE INVENTION

The invention is a self centering device that allows non contact laser inspection of a countersunk fastener hole on a surface. In detail, the device includes a combination laser transmitter and receiver for transmitting a laser bean across a surface and for receiving the return signal from the surface. A self centering device is attached to the combination laser transmitter and receiver for centering the laser transmitter with the fastener hole such that the transmitted and received laser beam passes across the center of the counter sink portion of the fastener hole. The adaptor includes a conical cone shaped member adapted to mate with the counter sink portion of the fastener hole; said member having a slot extending partial there through, such the laser beam can pass across the counter sink portion of the fastener hole. A computer system is connected to the combination laser transmitter and receiver for analyzing the transmitted and returned laser signal from the surface and determining if the counter sink portion of the hole is within tolerance.

The self centering device includes a conical cone shaped member adapted to mate with the counter sink portion of the fastener hole. The member includes a slot extending partial there through; such that the laser beam can pass across the counter sink portion of the fastener hole. The confocal point of the cone is a pinhole, which defines the center point of the laser beam line.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a perspective view of a prior art gap measurement device.

FIG. 2 is a side view of the device shown in FIG. 1.

FIG. 3 is a front view of the device shown in FIG. 1

FIG. 6 is a partial side view the device shown in FIG. 5 illustrating an attachment that allows the device to inspect countersunk holes.

FIG. 7 is a partial front view of the inspection device shown in FIG. 5.

FIG. 8 is a partial bottom view of the inspection device shown in FIG. 5.

DESCRIPTION OF THE PREFERRED EMBODIMENT

Figure 4:
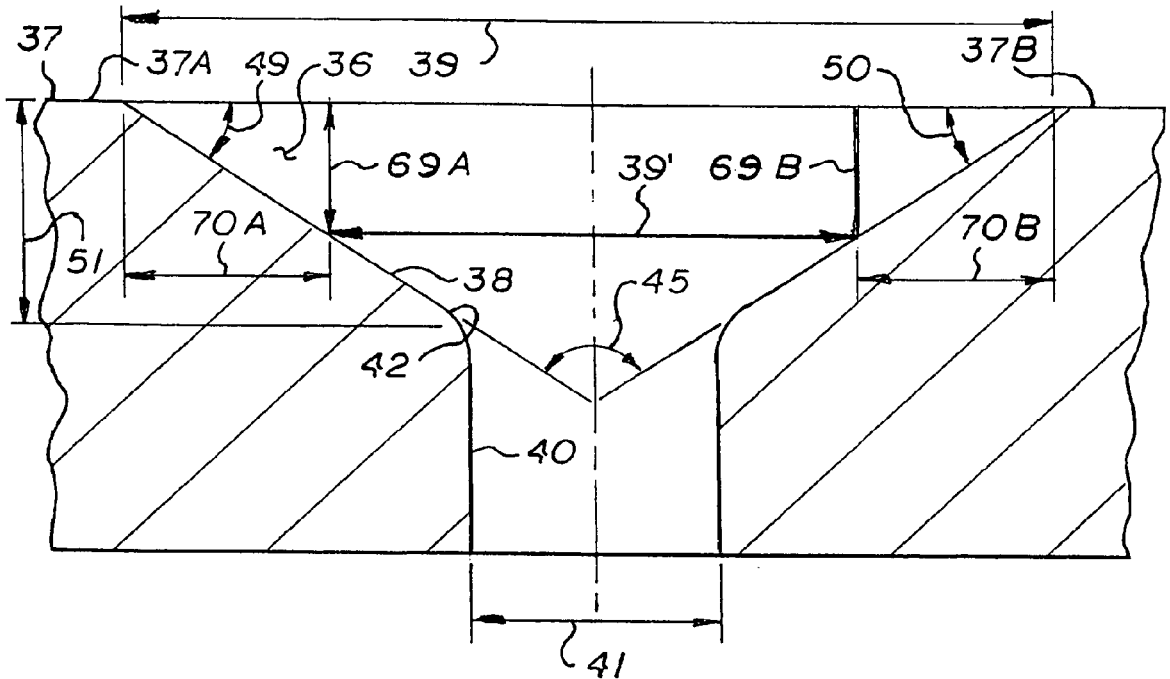
FIG. 4 is a cross-sectional view of a countersunk hole.
Figure 5:
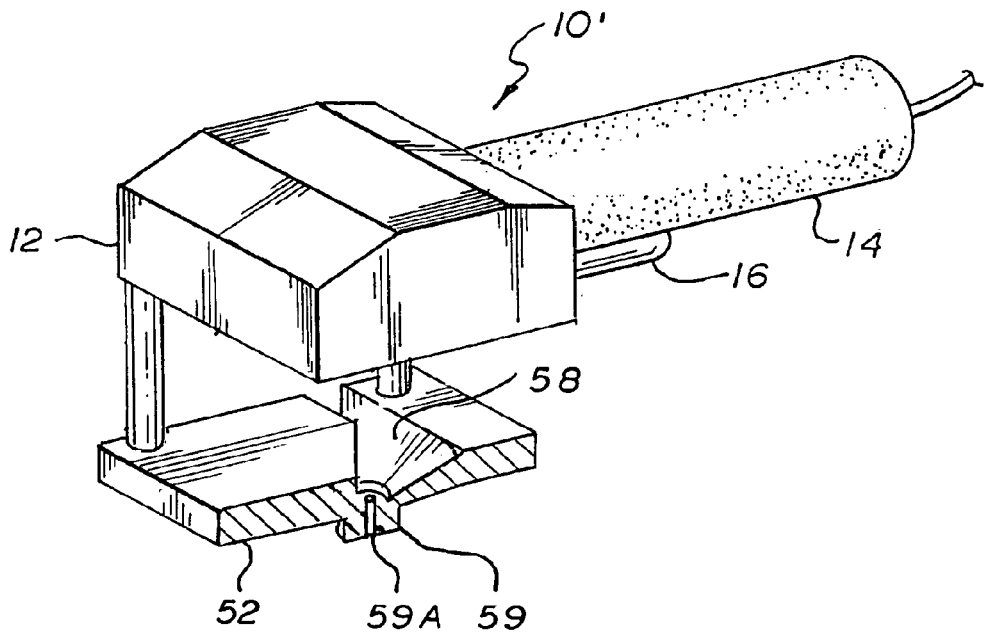
FIG. 5 is a perspective view the subject device.

Referring to FIGS. 1-3, the prior art device illustrated is a Model HS 305 manufactured by Origin Technologies, Madison, Ala. It is a hand held gap measuring device, particularly useful in measuring the gaps between body panels and doors on automobiles. There are numerous other devices on the market that work in a similar fashion. The device, generally indicated by numeral 10, includes a body 12 having a hand griping portion 14, actuation trigger 16 and sensor head 18. The sensor head 18 includes a laser transmitter 20 and receiver 22. Front support members 23A and 23B, which mount in holes 24A and 24B; and rear support members 25A and 25B, which mount in rear mounting holes 26A and 26B. These front and rear support members 23A, 23B and 25A and 25B position the laser transmitter 20 at a specific distance 27 from the surface 28 having a gap 29. The laser transmitter 20 is designed to transmit along a line 30 cycling at 10 cycles per second. The receiver 22 is at an angle 32, typically 60 degrees, such that it is aligned with the laser beam at the surface 28.

Connected to the device 10 is a display unit 35 having a computer (not shown). The device 10 is passed over the surface 28 along the gap 29. It is a simple calculation to determine the width of gap 29. The image is recorded and compared to the allowable gap value. If it is within tolerance, then an in specification signal is displayed. If oversized or undersized, the error or out of specification condition is indicated.

Shown in FIG. 4 is a typical countersunk hole 36 in a surface 37. The countersunk portion 38 with a diameter 39 and a hole portion 40 with a diameter 41. Note that there is a radius 42 a the intersection of the countersink portion 38 and hole 40, making the measurement of the countersink depth difficult to measure.

The countersink characteristics that are measured include:
1. Countersink diameter (Top Diameter) 39
2. Measured hole diameter 41
3. Included countersink angle 45
4. Left countersink angle 49, relative to left surface 37A
5. Right countersink angle 50 relative to right surface 37B
6. Countersink depth 51

Referring to FIGS. 5-8 this device, now indicated by numeral 10' can be modified to inspect countersinks in counter sunk fastener holes by replacing the front and back support members 23A, B and 25A,B with a self centering device 52. The alignment tool 52 includes a body 53 having a top surface 54 and a conical shaped portion 55 having and included angle of 55A degrees equal to the nominal angle 45 of the conical shaped countersink portion 38. The tool 52 further includes an end portion 56 attached to conical shaped portion 55, that enters the hole 36. The self centering device 52 further includes a recess 58 terminating extending from the top surface 54 through the conical shaped portion 55 and into the end portion 56 forming two openings 62A and 62B. This nearly divides the alignment tool 52 in half, but is held together by remain portions of the end portion 56. A hole 59 extends from the recess 58 into the end portion 56, with a centered pin hole 59A in the center. The self centering device 52 includes front mounting members 66A and 66B, which mate with holes 24A and 24B in the body 12. Rear mounting members 68A and 68B mate with holes 26A and 26B.

In operation, with the self centering device 52 attached to the body 12, the device is positioned such that the conical shaped portion 55 is positioned in the countersink portion 38 with the end portion 56 in the 36. This automatically self centers and seats the laser transmitter 20 and receiver 22. The trigger is pulled and the laser beam sweeps across the surface 37 and over the countersink portion 38. The receiver 22 picks up the reflected signal. The pick up of the reflected signal from the pin hole 59A indicates that the laser transmitter 20 and receiver 22 have been properly are measuring properly.

Figure 9:
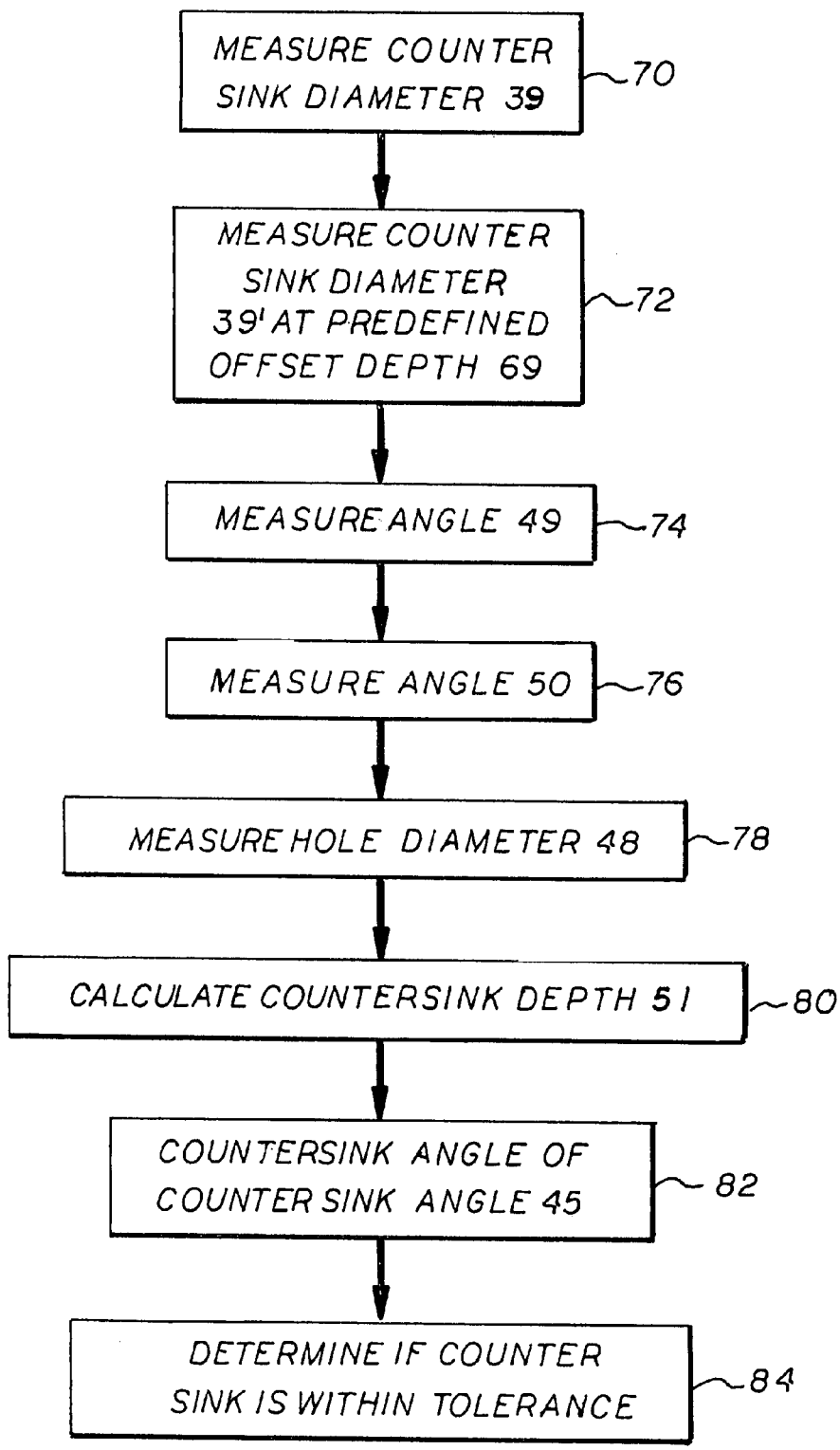
FIG. 9 is a flow chart of the software for determining whether the countersunk hole is within tolerance.

The display unit 35 computer calculates whether the countersink 38 is within tolerance. Referring to FIG. 9, the computer program includes the following steps:

Step 70 Measure Counter sink diameter 39

Step 72 Measure Counter sink diameter 39' at predefined offset depth 69. This is necessary because the actual countersink depth is difficult to determine because of radius 42 at the junction of the hole 40.

Step 74 Measure angle 49. This is accomplished by noting that the: $Tan^{-1}$ of angle 49=Distance 69A/Distance 70A Step 76 Measure angle 50. This is accomplished by noting that the $Tan^{-1}$ of angle 50=Distance 69B/Distance 70B Step 78 Measure hole diameter 41. If there is no fillet radius 42 the hole diameter may be measured with the countersink diameter. If there is a fillet radius 42 the self centering device will first measure hole diameter prior to countersinking providing the conical device seats within the hole and the end portion 56 seats within the hole.

Step 80 Calculate countersink depth 51. This is accomplished by noting from step 70 countersink diameter equals the sum of 70A and 70B and the hole diameter. The countersink depth is the calculated as distance 70A multiplied by Tan of angle 49 which equals the distance 70B multiplied by Tangent of angle 50

Step 82 Countersink angle of counter sink angle 45. This is measured directly by the laser or for flat plates only it maybe calculated by the equation Angle 45=180-Angle 49-Angle 50

Step 84 Determine if Counter sink is within tolerance.

The above method of making the measurements is somewhat arbitrary, and other methods can be used. Most will depend upon the type of laser measuring device used, most of which can be used with the subject self centering device.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to industries that manufacture inspection devices.

The invention claimed is

1. A non contact laser inspection self centering device to inspect and measure the counter sink portion of a counter sunk fastener hole on a surface, the device comprising:
   a combination laser transmitter and receiver for transmitting a laser beam across a surface and for receiving the return signal from the surface;
   a self centering device for aligning said laser transmitter with the fastener hole such that the transmitted and received laser beam passes across the center of the counter sink portion of the fastener hole, said device comprising:
      a conical cone shaped member adapted to mate with the counter sink portion of the fastener hole; said member having a slot extending partial there through, such that the laser beam can pass across the counter sink portion of the fastener hole and the hole itself; and
      means to mount said member to said combination laser transmitter; and
   a computer system for analyzing the transmitted and returned laser signal from the surface and determining if the counter sink portion of the hole is within tolerance.

2. The device as set forth in claim 1 wherein the confocal point of said cone shaped member is a pinhole located in the pilot diameter at the base of the cone, which defines the center point of the laser beam line.

* * * * *